United States Patent
Gouda et al.

(10) Patent No.: US 11,873,236 B1
(45) Date of Patent: Jan. 16, 2024

(54) DATE PALM FROND MODIFIED CELLULOSE EXTRACTS HYDROGEL-ENCASED WITH METAL OXIDES NANOHYBRIDS FOR WASTEWATER TREATMENT

(71) Applicant: KING FAISAL UNIVERSITY, Al-Ahsa (SA)

(72) Inventors: Mohamed Gouda, Al-Ahsa (SA); Hany M. Abd El-Lateef, Al-Ahsa (SA); Mai Mostafa Khalaf Ali, Al-Ahsa (SA); Fatemah Khalaf, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/139,461

(22) Filed: Apr. 26, 2023

(51) Int. Cl.
*C02F 1/46* (2023.01)
*C02F 1/461* (2023.01)
(Continued)

(52) U.S. Cl.
CPC ........ *C02F 1/46109* (2013.01); *C02F 1/4672* (2013.01); *C02F 2001/46142* (2013.01); *C02F 2101/345* (2013.01); *C02F 2101/38* (2013.01); *C02F 2103/34* (2013.01); *C02F 2305/08* (2013.01)

(58) Field of Classification Search
CPC ...... C02F 1/46; C02F 1/42; C02F 1/32; C02F 1/48; C02F 1/30
See application file for complete search history.

(56) References Cited

U.S. PATENT DOCUMENTS

| 2012/0171576 A1* | 7/2012 | Tsai | H01M 10/0567 |
| | | | 429/207 |
| 2013/0130049 A1* | 5/2013 | Moilanen | C08L 1/02 |
| | | | 252/62.51 R |

(Continued)

OTHER PUBLICATIONS

CN 105826586 A—English translation, Processing Of Perchlorate In Potassium Perchlorate Wastewater, Involves Filling Organic Wastewater In Anode Chamber, Filling Potassium Perchlorate Wastewater In Cathode Chamber And Measuring Chlorate Removal Rate, Wu Z. (Year: 2016).*

(Continued)

*Primary Examiner* — Walter D. Griffin
*Assistant Examiner* — Cameron J Allen
(74) *Attorney, Agent, or Firm* — Nath, Goldberg & Meyer; Richard C. Litman

(57) ABSTRACT

A carboxymethyl cellulose (CMC) nanohybrid composition comprising carboxymethyl cellulose loaded with metal nanoparticles, such as silver nanoparticles (AgNPs), iron nanoparticles (FeNPs), or silver nanoparticle-doped iron nanoparticles (AgNPs@FeNPs). These compositions can be used to remove contaminants, such as 2,4-dinitrophenol, from wastewater. The compositions are low-cost, eco-friendly, and highly efficient for 2,4-dinitrophenol removal, due to the high surface area to volume ratio and super catalytic effect to remove 2,4-dinitrophenol. The results indicate that the performance of fabricated AgNPs@Fe@CMC nanohybrids objectively is relatively high, and suitable compared to commercial materials.

16 Claims, 4 Drawing Sheets

(51) Int. Cl.
*C02F 1/467* (2023.01)
*C02F 103/34* (2006.01)
*C02F 101/38* (2006.01)
*C02F 101/34* (2006.01)

(56) References Cited

U.S. PATENT DOCUMENTS

2018/0258306 A1* 9/2018 Shukla .................. C09D 11/38
2021/0139654 A1 5/2021 Kamal et al.

OTHER PUBLICATIONS

Ahmad, et al.; "The use of date palm as a potential adsorbent for wastewater treatment: a review", Environ Sci Pollut Res (2012) 19:1464-1484.

Rahman, et al.; "Recent Developments of Carboxymethyl Cellulose", Polymers 2021, 13, 1345.https://doi.org/10.3390/polym13081345, Published: Apr. 20, 2021.

Alqahtani, et al.; "Carboxymethyl-Cellulose-Containing Ag Nanoparticles as an ElectrochemicalWorking Electrode for Fast Hydroxymethyl-Furfural Sensing in Date Molasses", Polymers 2023, 15, 79. https://doi.org/10.3390/polym15010079, Published: Dec. 25, 2022.

Faiad, et al.; "Date Palm Tree Waste Recycling: Treatment and Processing for Potential Engineering Applications", Sustainability 2022, 14, 1134. https://doi.org/10.3390/ su14031134, Published: Jan. 19, 2022.

* cited by examiner

DATE PALM FROND MODIFIED CELLULOSE EXTRACTS HYDROGEL-ENCASED WITH METAL OXIDES NANOHYBRIDS FOR WASTEWATER TREATMENT

BACKGROUND

Field

The disclosure of the present patent application relates to carboxymethyl cellulose nanohybrid compositions, and particularly to carboxymethyl cellulose (CMC) nanohybrid compositions comprising carboxymethyl cellulose loaded with metal nanoparticles.

DESCRIPTION OF THE PRIOR ART

In recent years, water contamination has grown to be a severe issue. Additionally, the US Environmental Protection Agency classifies 2,4-dinitrophenol, a phenol derivative, as a major pollutant. The manufacturing of polycarbonate resin, plastic, fragrances, textiles, and petroleum refineries are only a few of the sectors that employ all phenolic compounds extensively. Numerous techniques are used to detoxify phenolic compounds, contaminants in polluted water, due to their ubiquitous production and the health and environmental dangers associated with them. Due to its advantages, such as cheap cost and ecological friendliness, biopolymers employed for detoxification have emerged as a viable and practical method to deal with numerous refractory contaminants, such as 2,4-dinitrophenol. Numerous studies have been done on the removal of phenolic compounds using fungus and bacteria, but very little has been done on utilizing algae. The goal of this work is to produce eco-friendly, coast-effective nanohybrid materials using a waste-waste-management approach. Thus, compositions and methods to solve the aforementioned problems are desired.

SUMMARY OF THE INVENTION

A carboxymethyl cellulose nanohybrid composition includes carboxymethyl cellulose loaded with metal nanoparticles. The metal nanoparticles can be non-precious metal nanoparticles. The non-precious metal nanoparticles can be selected from the group consisting of silver nanoparticles (AgNPs), iron nanoparticles (FeNPs), and silver nanoparticle-doped iron nanoparticles (AgNPs(@FeNPs). The non-precious metal nanoparticles can be encased in a carboxymethyl cellulose (CMC) extract to provide AgNPs@CMC, FeNPs@CMC, and/or AgNPs@Fe@CMC. The carboxymethyl cellulose nanohybrid composition can be an effective catalyst for electrochemical oxidation-reduction of contaminants from industrial effluents. In an embodiment, the contaminants from industrial effluents include 2,6-dinitrophenol (2,6-DNP).

The carboxymethyl cellulose nanohybrid composition can be synthesized using a reduction co-precipitation method. In this procedure, a metal salt and sodium borohydride can undergo a precipitation reaction to produce metal oxide nanoparticles. Cellulose extracts, such as cellulose extracts from date palm fronds, can be carboxymethylated using mono-chloroacetic acid (CMC). A fresh metal salt solution including CMC can be prepared and metal oxide nanoparticles can be added to the aqueous solution followed by sodium borohydride. Sodium borohydride is infused in the prepared solution by mixing well. In order to separate the prepared metal nanoparticles encased in CMC, they will first be dried in an oven and then characterized.

These and other features of the present subject matter will become readily apparent upon further review of the following specification.

DETAILED DESCRIPTION

Figure 1:
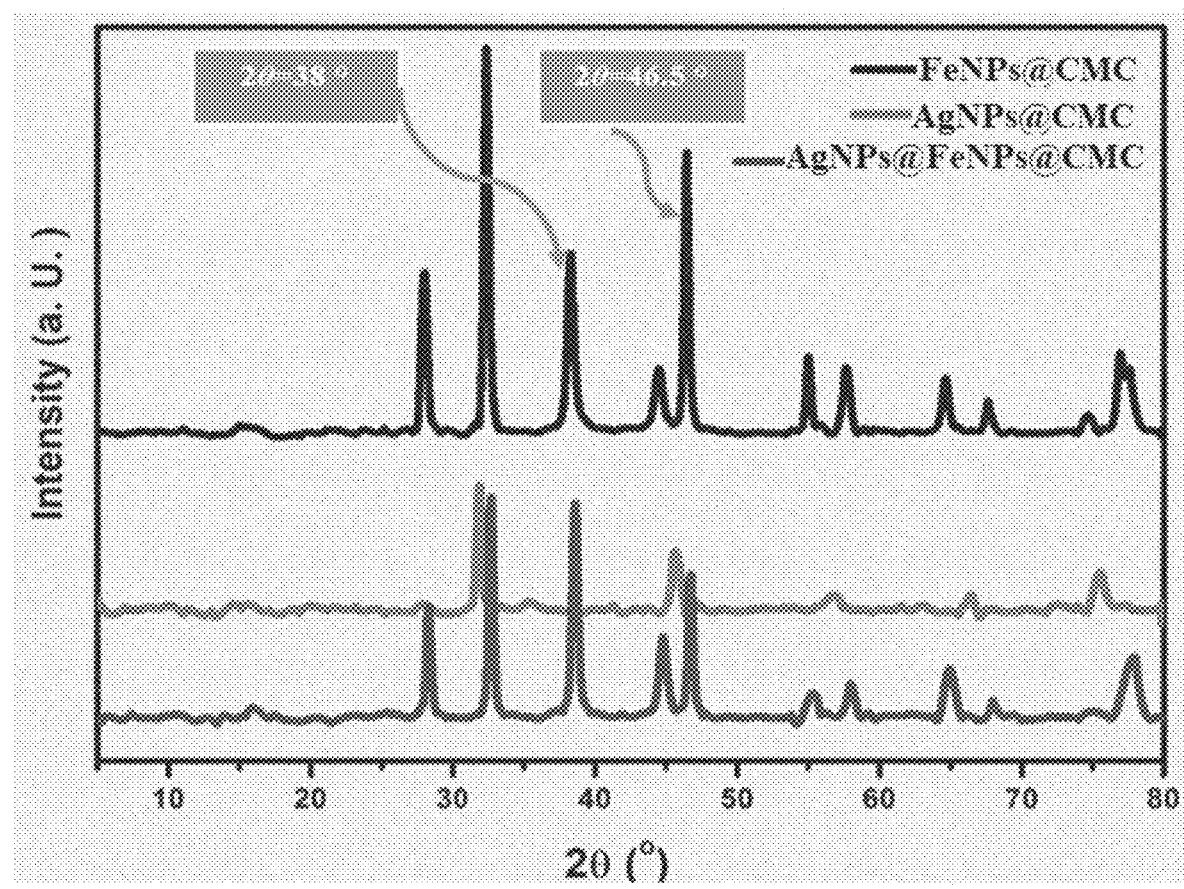
FIG. 1 is a graph showing X-ray diffraction patterns for AgNPs@CMC, FeNPs@CMC and AgNPs@FeNPs@CMC.

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

As used herein, a "carrier" includes any and all solvents, dispersion media, vehicles, coatings, diluents, isotonic and absorption delaying agents, buffers, carrier solutions, suspensions, colloids, excipients, and the like.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

According to the present subject matter, cellulose can be extracted from date palm fronds using the hypochlorite method. The thus produced cellulose extracts can then be carboxymethylated using mono-chloroacetic acid (CMC), with the CMC being available for further processing.

In an embodiment, the present subject matter relates to a carboxymethyl cellulose (CMC) nanohybrid composition including carboxymethyl cellulose loaded with metal nanoparticles. The metal nanoparticles can be non-precious metal nanoparticles. The non-precious metal nanoparticles can be encased in a carboxymethyl cellulose (CMC) extract to provide the nanohybrid composition. The carboxymethyl cellulose (CMC) nanohybrid composition can be an effective catalyst for electrochemical oxidation-reduction of contaminants from wastewater, e.g., industrial effluents. In an embodiment, the contaminants from wastewater include 2,6-dinitrophenol (2,6-DNP).

According to an embodiment, the non-precious metal nanoparticles can be selected from the group consisting of silver nanoparticles (AgNPs), iron nanoparticles (FeNPs), and silver nanoparticle-doped iron nanoparticles (AgNPs @FeNPs). In an embodiment, the non-precious metal nanoparticles are silver nanoparticle-doped iron nanoparticles (AgNPs@FeNPs). Any of these non-precious metal nanoparticles can have an average particle size ranging from about 20 nm to about 50 nm. In an embodiment, the average particle size ranges from about 20 nm to about 35 nm. In an embodiment, the average particle size ranges from about 35 nm to about 45 nm. In an embodiment, the average particle size ranges from about 45 nm to about 50 nm.

The non-precious metal nanoparticles can be encased in a carboxymethyl cellulose (CMC) extract to provide the carboxymethyl cellulose (CMC) nanohybrid composition. According to an embodiment, the carboxymethyl cellulose (CMC) nanohybrid composition can include silver nanoparticles encased in a CMC extract, herein, "AgNPs@CMC." According to an embodiment, the carboxymethyl cellulose (CMC) nanohybrid composition can include iron nanoparticles encased in a CMC extract, herein, "FeNPs@CMC." According to an embodiment, the carboxymethyl cellulose (CMC) nanohybrid composition can include silver-loaded iron nanoparticles encased in a CMC extract, herein, AgNPs@FeNPs@CMC, or AgNPs@Fe@CMC, both of which can be used interchangeably herein.

In an embodiment, the present subject matter relates to a modified electrode including an electrode and a coating on the electrode surface comprising the carboxymethyl cellulose (CMC) nanohybrid composition. In an embodiment, the electrode is a glassy carbon electrode (GCE). As described herein, the modified electrode demonstrated enhanced electrochemical oxidation behavior of 2,4-dinitrophenol (DNP), when compared to an uncoated electrode.

In this regard, the coated or modified glassy carbon electrode can be prepared by applying the prepared nanohybrid materials to a glassy carbon electrode (GCE). In this regard, the prepared nanohybrid materials can be mixed with an alcohol, including by way of non-limiting example isopropanol, in a container, which is tightly closed. Then, the tightly closed container can be placed into a sonication bath. After that, a drop of 5% Nation solution can be added, and the container can be placed again into the sonication bath for additional time. This resulted in a suspension ready to be cast on the surface of the GCE. The suspension can be cast, drop-wise, on the surface of the GCE and then left to dry at room temperature In an embodiment, a method of removing contaminants from wastewater can include contacting the modified electrode with the wastewater. In an embodiment, the wastewater includes industrial effluent. In an embodiment, the contaminant comprises 2,4-dinitrophenol.

According to an embodiment, the carboxymethyl cellulose (CMC) nanohybrid composition can be synthesized using a reduction co-precipitation method. In an embodiment, cellulose can be extracted from date palm fronds. In an embodiment, the hypochlorite method can be used to extract the cellulose from the date palm fronds. In an embodiment, the extracted cellulose, whether from date palm fronds or otherwise, can be carboxymethylated using mono-chloroacetic acid to provide a carboxymethyl cellulose (CMC) extract. In an embodiment, the CMC extract can be added to an aqueous solution including a metal salt and stirred to form a mixture.

In an embodiment, about 100 mL of the aqueous solution of a metal salt, at about 0.05M, can be mixed with about 2 g of CMC at room temperature for about 30 minutes. In an embodiment, sodium borohydride, for example, 0.5M of sodium borohydride, can be added to the mixture and stirring can be continued for about 30 minutes to about 2 hours to provide a metal-nanoparticle loaded CMC. In certain embodiments, the stirring can continue for 1 hour to provide a metal-nanoparticle loaded CMC. The metal nanoparticle-loaded CMC can be isolated, washed and dried. In an embodiment, the metal nanoparticle-loaded CMC can be dried in an oven at a temperature ranging from about 50° C. to about 70° C., e.g., 60° C., for about 20 hours to about 25 hours, e.g., about 24 hours.

In this regard, the present nanohybrids of Ag, Fe and Ag—Fe nanoparticles can be created using the reduction co-precipitation method with carboxymethyl cellulose extracts, thereby providing a composition having a coreshell structure. In this procedure, a metal salt, for example, Ag, Fe, or AG and Fe, and sodium borohydride can undergo a precipitation reaction to produce metal oxide nanoparticles. To obtain metal oxide nanoparticles(@CMC in the aqueous solution, sodium borohydride can be infused into the prepared solution while it is being mixed.

The following examples illustrate the present teachings.

EXAMPLES

Example 1

Preparation of AgNPs@CMC, FeNPs@CMC and AgNPs@Fe@CMC Nanocomposites

The AgNPs@CMC, FeNPs@CMC and AgNPs@Fe@CMC were separately prepared via the reduction co-precipitation method. In this method, 100 mL of an aqueous solution of metal salt (0.05M) was prepared and 2 g of CMC extract was added. The system was kept under stirring (500 rpm) at room temperature for 30 min. Thereafter, 0.5M of sodium borohydride was added to the solution containing the metal ion-loaded CMC under continuous stirring for 1 hour. The metal oxide loaded CMC was isolated, washed with distilled water, and dried in an oven at 60° C. for 24 hour. The silver nanoparticle-loaded CMC was labeled as AgNPs@CMC and iron nanoparticle CMC was labeled as FeNPs@CMC.

Example 2

Preparation of CMC/Ag$_2$O—Fe$_2$O$_3$ Nano-Hybrid

A freshly prepared aqueous solution of silver nitrate (0.1M) was added to the sample labeled as FeNPs@CMC with mechanical stirring. Thereafter, 0.5M of sodium borohydride was added. The obtained silver-loaded FeNPs@CMC was labelled as AgNPs@Fe@CMC.

Example 3

Coating Method

The prepared nanohybrid materials were applied to a glassy carbon electrode (GCE) as follows. 10 mg of material was mixed with 1.5 ml of isopropanol in a small container and the container was tightly closed. Then, the tightly closed container was placed into a sonication bath for 10 min. After that, a drop of 5% Nafion solution was added, and the container was placed again into the sonication bath for an additional 5 min. The suspension became ready to be cast on the surface of GCE. A drop of the suspension was cast on the surface of GCE and then left to dry at room temperature.

Figure 3:
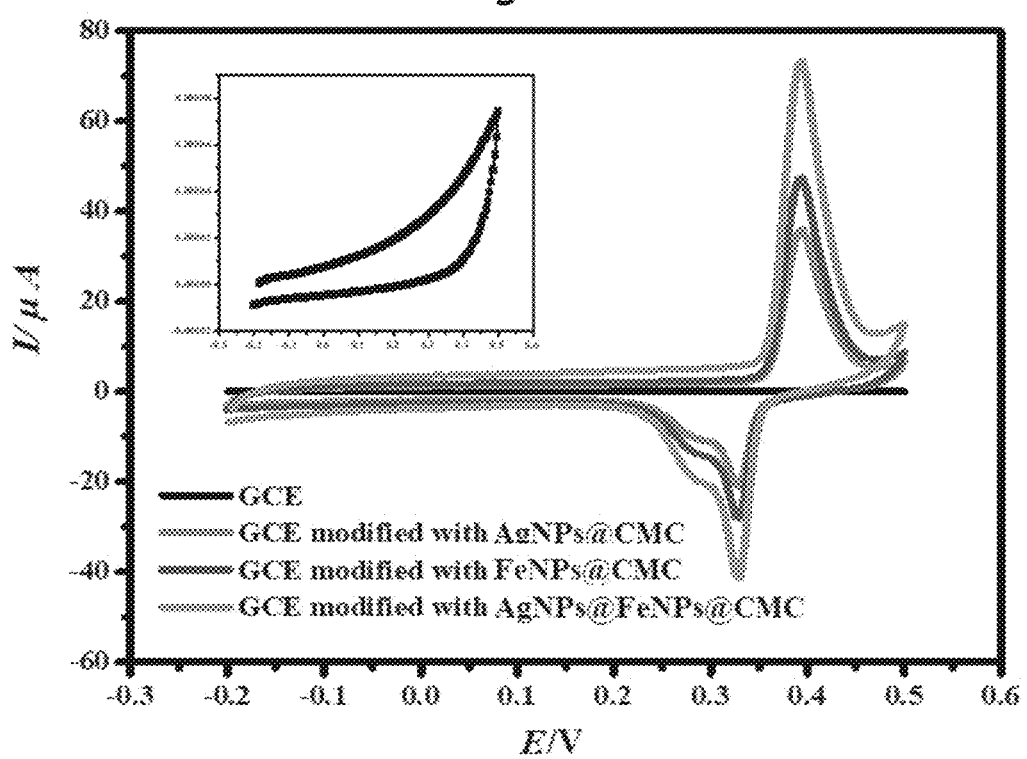
FIG. 3 depicts cyclic voltammograms of GCE-modified AgNPs @CMC, FeNPs@CMC and AgNPs@FeNPs@CMC in the presence of 0.2 mM DNP in Phosphate Buffered Saline (pH 7.0) at scan rate 100 mV/s.

The AgNPs@CMC, FeNPs@CMC and AgNPs@Fe@CMC-modified glassy carbon electrode (GCE) was prepared and used to examine the electrochemical oxidation behavior of 2,4-dinitrophenol (DNP) by cyclic voltammetry as presented in FIG. 3. When compared to the pristine GCE, the oxidation peak current of DNP at the modified GCE electrode was clearly higher, demonstrating that the AgNPs@CMC, FeNPs@CMC and AgNPs@Fe@CMC exhibit an exceptional enhancing impact on the electrochemical oxidation of DNP. Based on this, a quick and accurate electrochemical approach for the measurement of DNP was examined. The composite structure's impact was investigated.

The order of the DNP's oxidation peaks is AgNPs@CMC<FeNPs@CMC<AgNPs@Fe@ CMC. In the first step, the oxidation of DNP resulted in the formation of phenol and quinonic chemicals as well as the release of the nitro groups from the aromatic ring. These organics are converted into carboxylic acids in the subsequent phase (mainly maleic and oxalic acid). Carbon dioxide is the product of the end procedure. The proposed information was also used to remove DNP from water samples.

Figure 4:
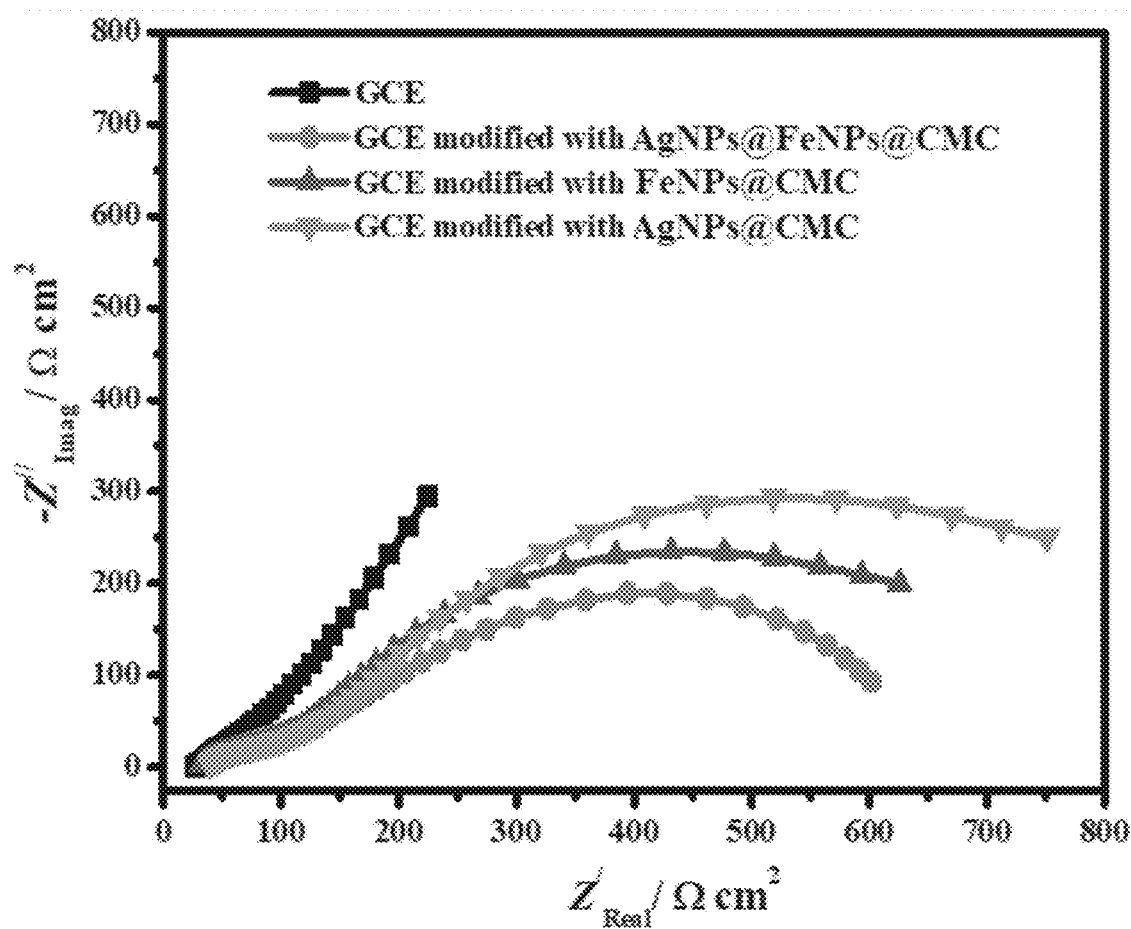
FIG. 4 depicts Nyquist plots at (CE-modified AgNPs@CMC, FeNPs@CMC and AgNPs@FeNPs@CMC in the presence of 0.2 mM DNP in Phosphate Buffered Saline (pH 7.0) at scan rate 100 mV/s.

Additionally, the construction of electrodes was very simple, and the modified material was inexpensive and simple to gain. FIG. 4 displays the results of Nyquist plots at GCE-modified AgNPs@CMC, FeNPs@CMC and AgNPs@Fe@CMC and in the presence of 0.2 mM DNP in Phosphate Buffered Saline (pH 7.0) at Scan rate, 100 mV/s. A semicircle was clearly visible for the modified GCE with AgNPs@CMC, FeNPs@CMC and AgNPs@Fe@CMC nanocomposites in DNP, demonstrating the existence of a new charge transfer method of DNP electrooxidation. When the electrode material is changed from AgNPs@CMC, FeNPs@CMC and AgNPs@Fe@CMC, the polarization resistance decreases, which indicates improved electrolyte-electrode interaction in the case of the AgNPs@Fe@CMC electrode when compared to the AgNPs@CMC, FeNPs@CMC electrodes and supports improved electron transfer for the AgNPs@Fe@CMC electrode.

Example 4

Characterization

The structural information of the prepared AgNPs@CMC, FeNPs@CMC and AgNPs@Fe@CMC nanomaterials was investigated by XRD patterns. Diffraction peaks grow sharper and higher, indicating improved iron and Ag phases crystallinity on the CMC surface (FIG. 1). The sample of FeNPs@CMC was identified as single phase a Fe (bcc) due to the clear presence of the diffraction peaks at 44.5 and 65 degrees. Furthermore, its estimated average particle size was 20 nm of the miller indices of (110), according to the Scherrer formula. On the other hand, the XRD pattern of AgNPs@CMC showed that the structure of Ag-NPs is face-centered cubic. Additionally, the diffraction profiles of all the Ag-NPs were comparable, and the XRD peaks at 2θ of 38.18°, 46.25°, 64.72°, and 77.40° were each assigned to one of the face-centered cubic silver crystals' 111, 200, 220, or 311 crystallographic planes. Thus, it was evident from the XRD pattern that the AgNPs@Fe@CMC produced in this study were crystalline in character. Due to the presence of impurities in the XRD patterns, the primary crystalline phases were silver and iron, and there were no other apparent phases in the XRD pattern of AgNPs@Fe@CMC. The estimated average particle sizes were 32 nm and 25 nm for CMC Ag and AgNPs@Fe@CMC, respectively.

Figure 2A:
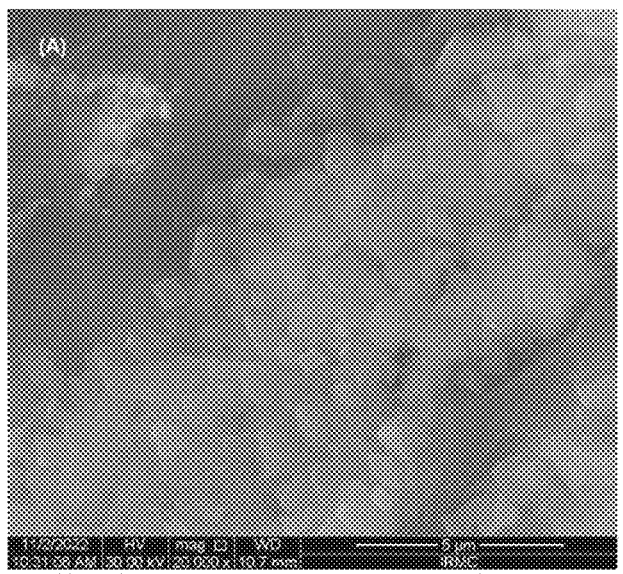
FIGS. 2A-2C show scanning electron images of (2A) AgNPS@CMC; (2B) FeNPs@CMC; and (2C) AgNPs@FeNPs@CMC.
Figure 2B:
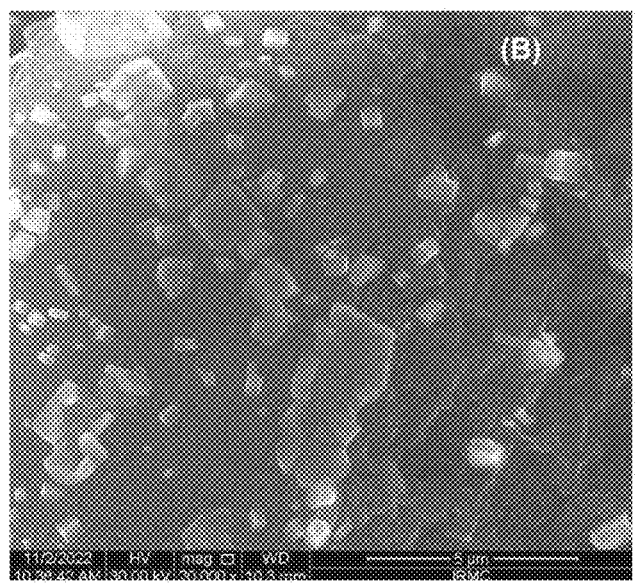
Figure 2C:
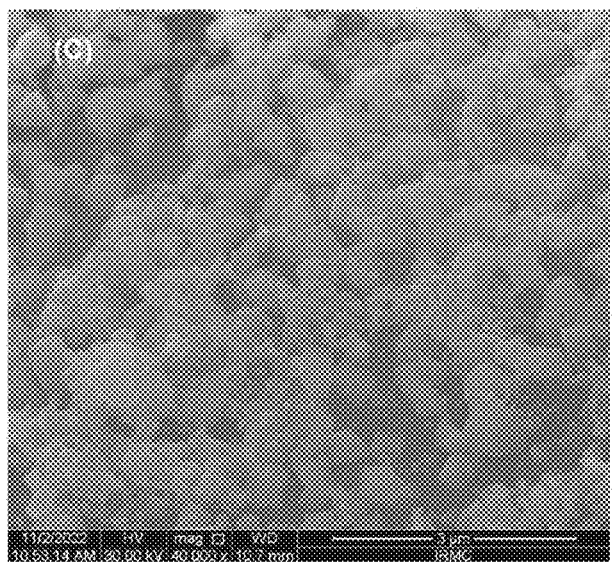

The morphology and nanostructural information of the samples were studied using a SEM microscope, as shown in FIGS. 2A-2C. Metal nanoparticles, such as AgNPs, FeNPs and AgNPs@Fe, were dispersed uniformly throughout the CMC; matrix, and there were no agglomerations observed. FIGS. 2A-2C reveal that the CMC surface is completely covered with highly distributed clustered grains of nanoparticles with an average size of 25 nm-50 nm.

Example 5

Electrochemical Methods

Cyclic voltammetry responses of all measurements were recorded at −0.2 V to 0.6 V. EIS tests were examined in the frequency range from 105 Hz to 0.1 Hz.

It is to be understood that the composition and methods are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A modified electrode, comprising an electrode and a coating including a carboxymethyl cellulose (CMC) nanohybrid composition on a surface of the electrode, the nanohybrid composition comprising:
carboxymethyl cellulose loaded with metal nanoparticles; wherein the metal nanoparticles are silver nanoparticle-doped iron nanoparticles, and wherein the metal nanoparticles have an average particle size ranging from about 20 nm to about 50 nm.

2. The modified electrode of claim 1, wherein the electrode is a glassy carbon electrode.

3. A method of removing contaminants from wastewater, comprising contacting the modified electrode of claim 1, with the wastewater.

4. The method of claim 3, wherein the wastewater comprises industrial effluent.

5. The method of claim 4, wherein the contaminants comprise 2,4-dinitrophenol.

6. A modified electrode, comprising a glassy carbon electrode and a coating including a carboxymethyl cellulose (CMC) nanohybrid composition on a surface of the glassy carbon electrode, the carboxymethyl cellulose (CMC) nanohybrid composition comprising carboxymethyl cellulose loaded with metal nanoparticles.

7. The modified electrode of claim 6, wherein the metal nanoparticles are selected from the group consisting of silver nanoparticles, iron nanoparticles, and silver nanoparticle-doped iron nanoparticles.

8. The modified electrode of claim 6, wherein the metal nanoparticles are silver nanoparticle-doped iron nanoparticles.

9. The modified electrode of claim 6, wherein the metal nanoparticles have an average particle size ranging from about 20 nm to about 50 nm.

10. A method of removing contaminants from wastewater, comprising contacting the modified electrode of claim 6 with the wastewater.

11. The method of claim 10, wherein the wastewater comprises industrial effluent.

12. The method of claim 10, wherein the contaminants comprise 2,4-dinitrophenol.

13. A method of removing contaminants from wastewater, comprising contacting a modified electrode with the wastewater, the modified electrode comprising an electrode and a carboxymethyl cellulose (CMC) nanohybrid composition comprising carboxymethyl cellulose loaded with metal nanoparticles on a surface of the modified electrode, wherein the contaminants comprise 2,4-dinitrophenol.

14. The method of claim 13, wherein the metal nanoparticles are selected from the group consisting of silver nanoparticle, iron nanoparticles, and silver nanoparticle-doped iron nanoparticles.

15. The method of claim 13, wherein the metal nanoparticles have an average particle size ranging from about 20 nm to about 50 nm.

16. The method of claim 13, wherein the wastewater comprises industrial effluent.

\* \* \* \* \*